(12) United States Patent
Kuroda

(10) Patent No.: US 11,325,317 B2
(45) Date of Patent: May 10, 2022

(54) METHOD AND APPARATUS FOR PRODUCING THREE-DIMENSIONAL EMBLEM MADE OF THERMOPLASTIC SYNTHETIC RESIN

(71) Applicant: Takeshi Kuroda, Osaka (JP)

(72) Inventor: Takeshi Kuroda, Osaka (JP)

( * ) Notice: Subject to any disclaimer, the term of this patent is extended or adjusted under 35 U.S.C. 154(b) by 222 days.

(21) Appl. No.: 16/611,890

(22) PCT Filed: Apr. 22, 2019

(86) PCT No.: PCT/JP2019/016911
§ 371 (c)(1),
(2) Date: Nov. 8, 2019

(87) PCT Pub. No.: WO2020/217264
PCT Pub. Date: Oct. 29, 2020

(65) Prior Publication Data
US 2021/0331420 A1    Oct. 28, 2021

(51) Int. Cl.
*B32B 41/00* (2006.01)
*B29C 65/04* (2006.01)
(Continued)

(52) U.S. Cl.
CPC .............. *B29C 65/04* (2013.01); *B29C 35/12* (2013.01); *B29C 43/146* (2013.01); *B29C 43/40* (2013.01);
(Continued)

(58) Field of Classification Search
CPC ... B29C 65/04; B29C 66/72321; B29C 35/12; B29C 43/146; B29C 66/30621;
(Continued)

(56) References Cited

U.S. PATENT DOCUMENTS

2007/0296118 A1    12/2007    Kuwahaha
2013/0068376 A1    3/2013    Kuwahara
(Continued)

FOREIGN PATENT DOCUMENTS

CN    101056755 A    10/2007
JP    S62-211128 A    9/1987
(Continued)

OTHER PUBLICATIONS

Jun. 18, 2019 International Search Report issued in International Patent Application No. PCT/JP2019/016911.
(Continued)

*Primary Examiner* — Michael N Orlando
*Assistant Examiner* — Joshel Rivera
(74) *Attorney, Agent, or Firm* — Oliff PLC

(57) ABSTRACT

A method wherein a bulky three-dimensional emblem can be made of a thermoplastic synthetic resin containing a vapor-deposited-metal laminated film. An apparatus for producing a three-dimensional emblem made of a thermoplastic synthetic resin includes a slide jig in which an electrode flat plate die and an electrode projecting die are slidable in a horizontal plane, an electrode recessed die capable of approaching and separating from the slide jig in a vertical direction and at a position where it can oppose the electrode flat plate die and the electrode projecting die, and a high-frequency oscillator that performs high-frequency dielectric heating by continuously generating a high-frequency voltage across the opposing dies, wherein recesses form in a surface of the electrode flat plate die opposing the electrode recessed die, and during high-frequency dielectric heating, a portion of the lower layer material enters the recess and is held on the electrode flat plate die.

6 Claims, 7 Drawing Sheets

(51) Int. Cl.
*B29C 35/12* (2006.01)
*B29C 43/14* (2006.01)
*B29C 43/40* (2006.01)
*B29C 65/00* (2006.01)
*B44C 1/14* (2006.01)
*B44C 3/08* (2006.01)
*B29K 27/06* (2006.01)
*B29L 31/00* (2006.01)

(52) U.S. Cl.
CPC ........ *B29C 66/30621* (2013.01); *B29C 66/71* (2013.01); *B29C 66/727* (2013.01); *B29C 66/72321* (2013.01); *B29C 66/742* (2013.01); *B29C 66/81431* (2013.01); *B29C 66/8322* (2013.01); *B44C 1/14* (2013.01); *B44C 3/085* (2013.01); *B29C 2793/009* (2013.01); *B29K 2027/06* (2013.01); *B29L 2031/722* (2013.01)

(58) Field of Classification Search
CPC ..... B29C 66/8322; B29C 66/71; B29C 43/40; B29C 66/81431; B29C 66/742; B29C 66/727; B29C 2793/009; B44C 1/14; B44C 3/085; B29K 2027/06; B29L 2031/722
USPC .................... 156/60, 64, 350, 351, 378, 379
See application file for complete search history.

(56) References Cited

U.S. PATENT DOCUMENTS

2017/0217084 A1    8/2017  Kuwahara
2017/0355148 A1*  12/2017  Kuwahara ............ B29C 66/433
2021/0187864 A1    6/2021  Kuwahara

FOREIGN PATENT DOCUMENTS

| JP | H01-241427 A | 9/1989 |
| JP | H03-222727 A | 10/1991 |
| JP | H08-230394 A | 9/1996 |
| JP | H5-254297 B2 | 8/2013 |
| JP | 6496884 B1 | 4/2019 |

OTHER PUBLICATIONS

Jun. 18, 2019 Written Opinion issued in International Patent Application No. PCT/JP2019/016911.

May 7, 2020 Search Report issued in European Patent Application No. 19794405.1.

Dec. 29, 2021 Office Action issued in Chinese Patent Application No. 201980002916.1.

* cited by examiner

METHOD AND APPARATUS FOR PRODUCING THREE-DIMENSIONAL EMBLEM MADE OF THERMOPLASTIC SYNTHETIC RESIN

TECHNICAL FIELD

The present invention relates to an apparatus and a method for producing a three-dimensional emblem made of a thermoplastic synthetic resin for use while being attached to an object such as a car, a motorbike, a boat, a household electrical appliance, a game console, clothes, a bag, and a cap.

BACKGROUND ART

Three-dimensional emblems, such as emblems, appliques, and stickers, made of a thermoplastic synthetic resin through high-frequency dielectric heating have been proposed (see Patent Document 1, for example).

A three-dimensional emblem is obtained by performing high-frequency dielectric heating on an upper layer material containing a vapor-deposited-metal laminated film and a lower layer material containing a thermoplastic synthetic resin sheet or a foamed resin sheet (hereinafter, these materials are collectively referred to as "three-dimensional emblem material") while the two materials are sandwiched between an engraved die and a flat plate die, to thereby weld the upper layer material and the lower layer material to each other while softening and shaping the lower layer material.

CITATION LIST

Patent Document

[Patent Document 1] Japanese Patent No. 3235943

SUMMARY OF INVENTION

Technical Problem

Recently, increased bulkiness of a three-dimensional emblem has been in demand to enhance the sense of luxuriousness and the three-dimensional appearance of the emblem. However, high-frequency dielectric heating has the property of radio waves being focused on a cutting edge, or a corner portion of a design. Accordingly, if the thickness of the lower layer material is increased to produce a bulky three-dimensional emblem, the entire three-dimensional emblem material will not be heated, and shaping and welding can no longer be satisfactorily performed. For this reason, the thickness of three-dimensional emblems that can be produced has been limited to up to about 2 mm.

Moreover, although it is conceivable to increase the power of high-frequency dielectric heating, an overcurrent will occur during the high-frequency dielectric heating. As a result, a blushing phenomenon may occur in the vapor-deposited metal layer, resulting in a burnt surface of the three-dimensional emblem.

An object of the present invention is to provide an apparatus and a method with which a bulky three-dimensional emblem made of a thermoplastic synthetic resin, the three-dimensional emblem containing a vapor-deposited-metal laminated film, can be produced.

Solution to Problem

An apparatus for producing a three-dimensional emblem made of a thermoplastic synthetic resin of the present invention is an apparatus for producing a three-dimensional emblem made of a thermoplastic synthetic resin, the three-dimensional emblem being obtained by welding and integrating an upper layer material containing a vapor-deposited-metal laminated film and a lower layer material containing a thermoplastic synthetic resin sheet through high-frequency dielectric heating, the apparatus including:

a slide jig in which an electrode flat plate die and an electrode projecting die are provided in such a manner as to be slidable in a horizontal plane;

an electrode recessed die that is capable of approaching and separating from the slide jig in a vertical direction and is disposed at a position where the electrode recessed die can oppose the electrode flat plate die and the electrode projecting die; and a high-frequency oscillator that, in a state in which the electrode recessed die and the electrode flat plate die or the electrode projecting die of the slide jig are opposed to each other, performs high-frequency dielectric heating by continuously generating a high-frequency voltage across the opposing dies, wherein one or more recesses are formed in a surface of the electrode flat plate die that opposes the electrode recessed die, and when high-frequency dielectric heating is performed with the lower layer material sandwiched between the electrode flat plate die and the electrode recessed die, a portion of the lower layer material enters the recess, so that the lower layer material that has been shaped is held on the electrode flat plate die.

It is desirable that a coming-out preventing member for preventing the lower layer material that has entered the recess of the electrode flat plate die from coming out is formed in the recess.

It is possible that the recess of the electrode flat plate die has a wedge-like shape that gradually increases in internal diameter.

Moreover, a method for producing a three-dimensional emblem according to the present invention is a method for producing a three-dimensional emblem made of a thermoplastic synthetic resin, the three-dimensional emblem being obtained by welding and integrating an upper layer material containing a vapor-deposited-metal laminated film and a lower layer material containing a thermoplastic synthetic resin sheet through high-frequency dielectric heating with the use of an apparatus for producing a three-dimensional emblem made of a thermoplastic synthetic resin, the apparatus including:

a slide jig in which an electrode flat plate die and an electrode projecting die are provided in such a manner as to be slidable in a horizontal plane;

an electrode recessed die that is capable of approaching and separating from the slide jig in a vertical direction and is disposed at a position where the electrode recessed die can oppose the electrode flat plate die and the electrode projecting die; and a high-frequency oscillator that, in a state in which the electrode recessed die and the electrode flat plate die or the electrode projecting die of the slide jig are opposed to each other, performs high-frequency dielectric heating by continuously generating a high-frequency voltage across the opposing dies, the method including:

a lower layer shaping step of disposing the lower layer material between the electrode flat plate die and the electrode recessed die, bringing the electrode flat plate die and the electrode recessed die closer to each other, and performing high-frequency dielectric heating, wherein the lower layer material that has been shaped is held on the electrode flat plate die, and the electrode flat plate die and the electrode recessed die are separated from each other;

an upper layer molding step of molding the upper layer material by sliding the electrode projecting die of the slide jig such that the electrode projecting die opposes the electrode recessed die, disposing the upper layer material between the electrode projecting die and the electrode recessed die, bringing the electrode projecting die and the electrode recessed die closer to each other, and performing high-frequency dielectric heating, wherein the upper layer material that has been molded is held on the electrode recessed die, and the electrode projecting die and the electrode recessed die are separated from each other; and a welding step of sliding the electrode flat plate die holding the lower layer material, of the slide jig such that the electrode flat plate die opposes the electrode recessed die holding the upper layer material, bringing the electrode flat plate die and the electrode recessed die closer to each other, and performing high-frequency dielectric heating while pressing the lower layer material and the upper layer material that are laid one on top of the other, thereby welding the lower layer material and the upper layer material to each other, and then separating the electrode flat plate die and the electrode recessed die from each other.

It is desirable that one or more recesses are formed in a surface of the electrode flat plate die that opposes the electrode recessed die, and, in the lower layer shaping step, a portion of the lower layer material enters the recess, so that the lower layer material is held on the electrode flat plate die.

It is desirable that, in the lower layer shaping step, the lower layer material is held on the electrode flat plate die by attaching the lower layer material to the electrode flat plate die with a piece of pressure-sensitive adhesive tape.

Effects of the Invention

According to the apparatus and the method for producing a three-dimensional emblem of the present invention, the upper layer material and the lower layer material are integrated through welding after being individually shaped or molded. Thus, in shaping the lower layer material, a high current can be applied during high-frequency dielectric heating, and therefore, the shaping can be performed even when the lower layer material has a thickness of more than 2 mm. Since the lower layer material alone can be subjected to shaping, blushing of the upper layer material that may be caused by an overcurrent during high-frequency dielectric heating can be prevented.

Moreover, after the shaping of the lower layer material is performed using the electrode flat plate die and the electrode recessed die, the electrode flat plate of the slide jig is slid, with the shaped lower layer material still held on the electrode flat plate die, and thus, the die opposing the electrode recessed die can be switched to the electrode projecting die. Then, the upper layer material can be molded using the thus slid electrode projecting die and the electrode recessed die.

At this time, with the molded upper layer material still held on the electrode recessed die, the electrode flat plate die of the slide jig is slid so that the electrode flat plate die opposes the electrode recessed die. Thus, the lower layer material held on the electrode flat plate die and the upper layer material held on the electrode recessed die can be opposed to each other and integrated through welding. Since the lower layer material and the upper layer material are held attached to the respective dies after being individually shaped or molded, the shaped lower layer material and the molded upper layer material can be integrated without positional displacement occurring, by aligning the dies with each other.

DESCRIPTION OF EMBODIMENTS

Figure 1:
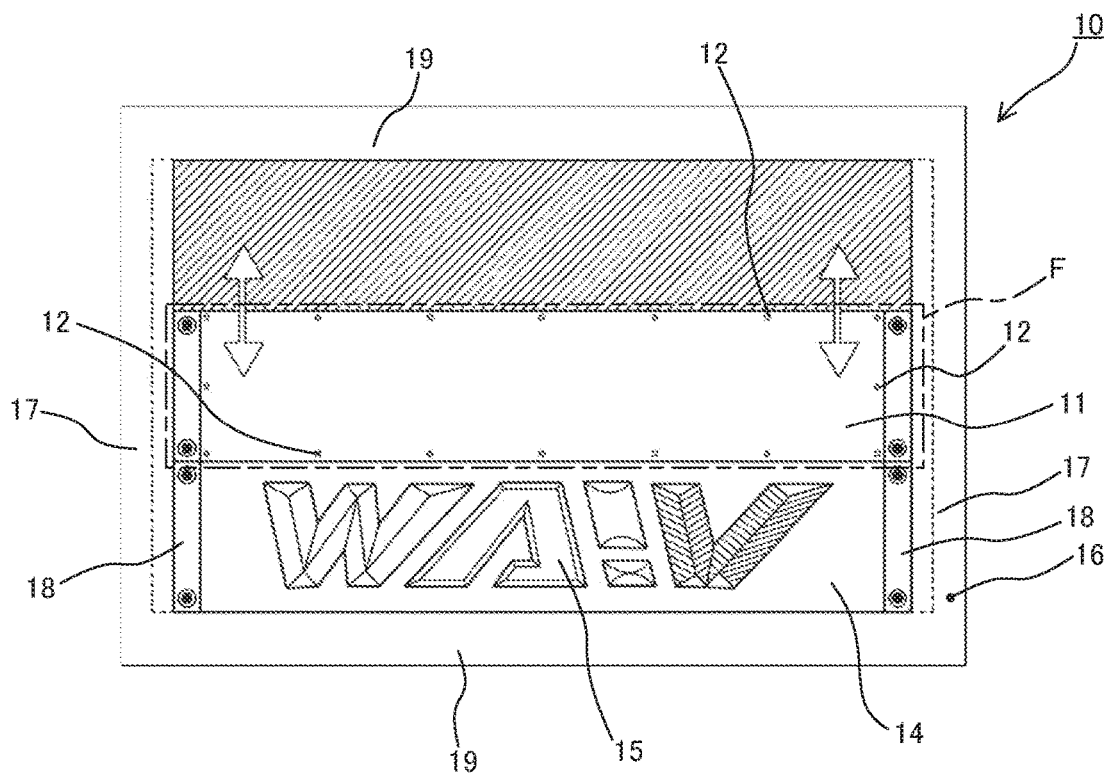
FIG. 1 is a plan view showing an embodiment of a slide jig.

Hereinafter, an apparatus and a method for producing a three-dimensional emblem 40 made of a thermoplastic synthetic resin of the present invention will be described with reference to the drawings. Note that, in the drawings, the thickness of layers of the three-dimensional emblem 40, projections and recesses of dies, the thickness of the dies, and the like are shown exaggerated to facilitate the explanation. Also, the size, the shape, the design, and the like of the three-dimensional emblem 40 are given by way of example only, and can be changed as appropriate.

According to the apparatus and the method for producing the three-dimensional emblem 40 of the present invention, provided are a slide jig 10 in which two dies 11 and 14 are slidably arranged, as well as a die 20 to which the dies 11 and 14 are to oppose by being slid, and a lower layer material 44 and an upper layer material 46 are individually sandwiched between the opposing dies and separately subjected to high-frequency dielectric heating, and furthermore, the lower layer material 44 and the upper layer material 46 are integrated through welding.

Figure 3:
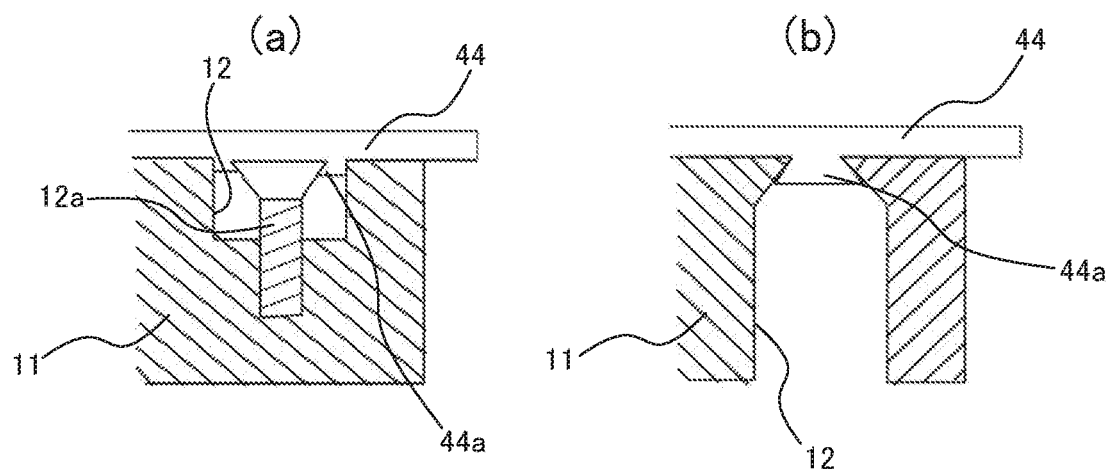
FIG. 3(a) is an enlarged cross-sectional view of a recess in FIG. 2 taken along line B-B.
FIG. 3(b) is an enlarged cross-sectional view of a recess having a different shape.
Figure 4:
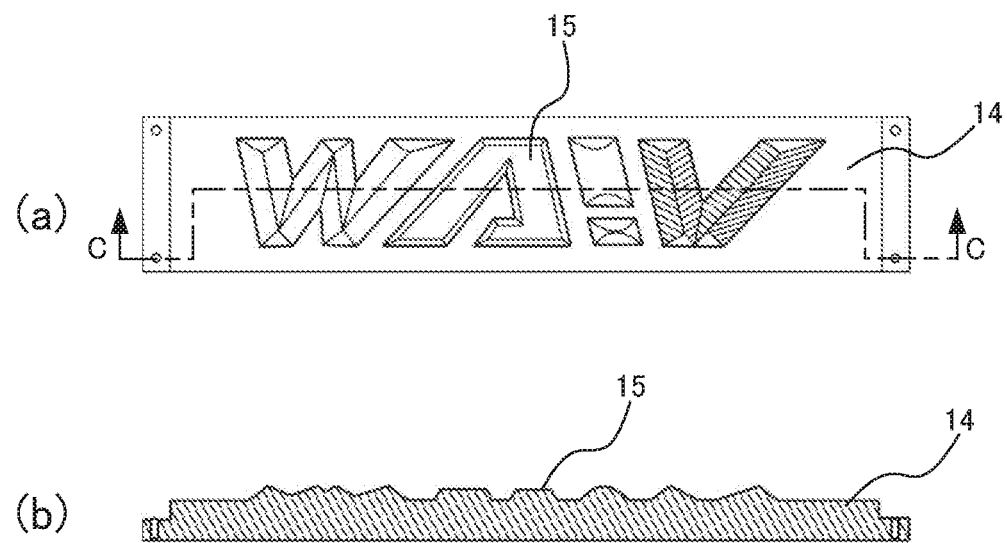
FIG. 4(a) is a plan view of an electrode projecting die.
FIG. 4(b) is a cross-sectional view thereof taken along line C-C.
Figure 5:
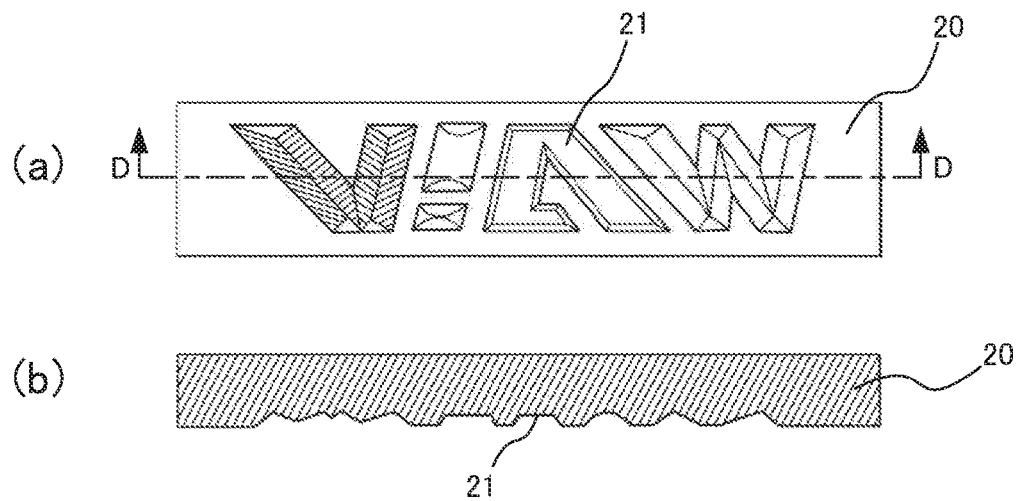
FIG. 5(a) is a plan view of an electrode recessed die.
FIG. 5(b) is a cross-sectional view thereof taken along line D-D.
Figure 6:
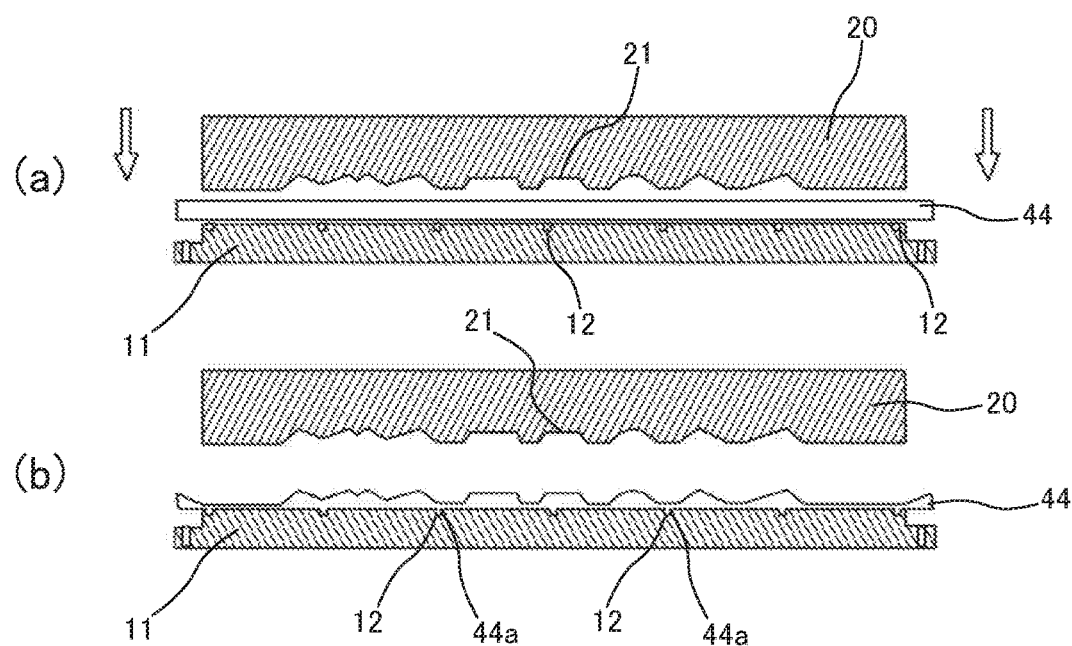
FIG. 6 is an explanatory diagram for illustrating a lower layer shaping step.
Figure 8:
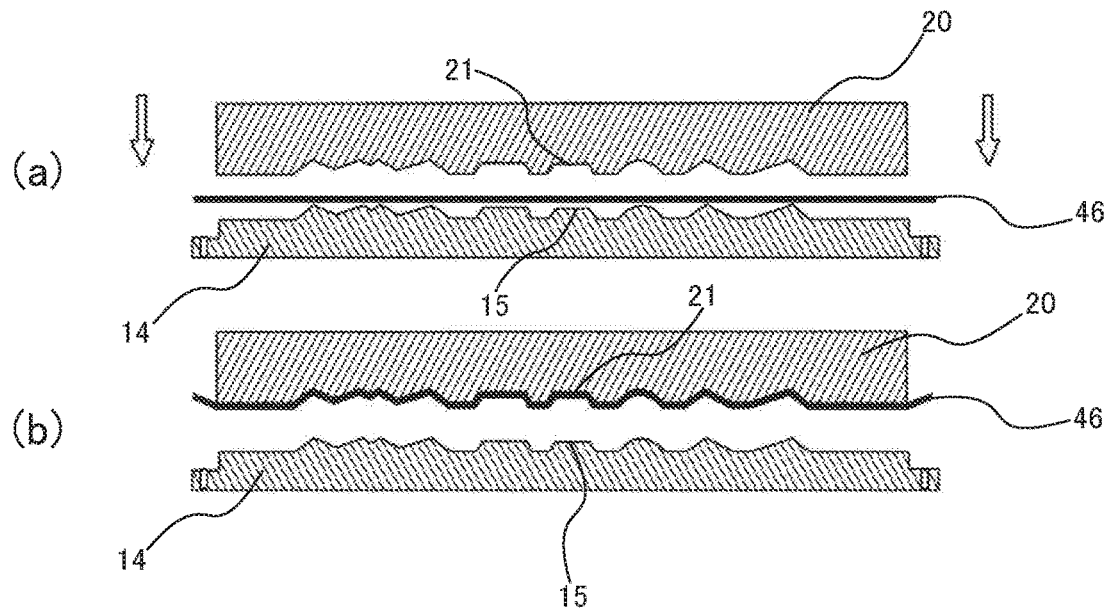
FIG. 8 is an explanatory diagram for illustrating an upper layer molding step.

The apparatus for producing the three-dimensional emblem 40 has a configuration in which the slide jig 10 and the dies 11 and 14 shown in FIGS. 1 to 4, as well as the die 20 shown in FIG. 5 are attached to an apparatus that includes a table on which a high-frequency dielectric oscillator and a die are to be mounted, as well as a mechanism for moving a die up and down. As shown in FIGS. 6 and 8, etc., the die 20 is disposed opposing the dies 11 and 14 of the slide jig 10. Note that a production apparatus in which the slide jig 10 is disposed on the lower side while the die 20 is disposed with an engraved surface thereof facing downward will be described below.

Figure 2:
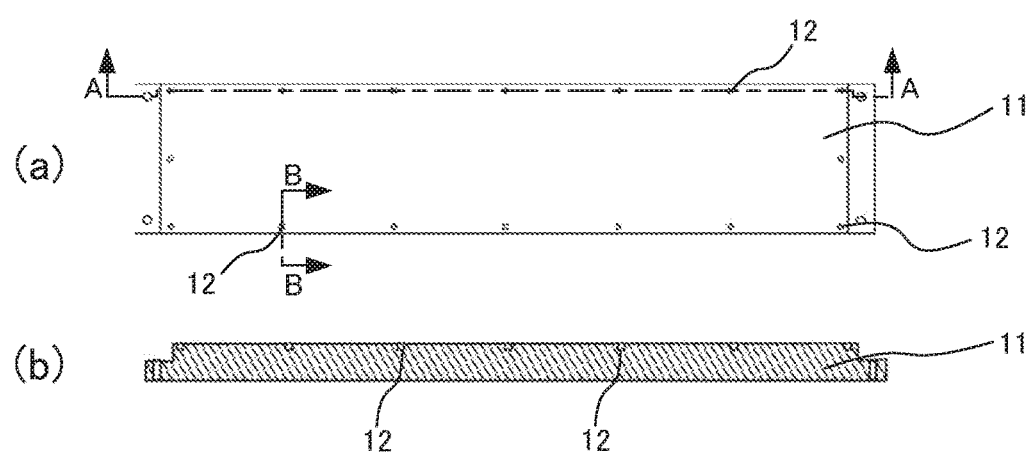
FIG. 2(a) is a plan view of an electrode flat plate die.
FIG. 2(b) is a cross-sectional view thereof taken along line A-A.

As shown in FIG. 1, the slide jig 10 has a configuration in which the two dies 11 and 14 are slidably arranged in an inner window of a rectangular frame 16. One of the dies is an electrode flat plate die 11, and an upper surface thereof is formed to be flat as shown in FIG. 2. The other die is an electrode projecting die 14 as shown in FIG. 4, and a pattern 15 of the design to be applied to the three-dimensional emblem 40 is provided protruding therefrom.

As shown in FIG. 2, the electrode flat plate die 11 has one or more recesses 12 formed in an upper surface thereof. The recesses 12 are formed at positions where they overlap the lower layer material 44, which will be described later, and not where they would overlap a design portion 42 of the three-dimensional emblem 40, that is, positions where they oppose an unnecessary portion to be removed in a downstream step. In the present embodiment, a plurality of recesses 12 are formed near peripheral edges of the electrode flat plate die 11.

A recess 12 allows a portion 44a of the lower layer material 44 to enter in a lower layer shaping step, which will be described later, and thus holds the lower layer material 44 on the electrode flat plate die 11. In order to hold the lower layer material 44, the recess 12 desirably has a configuration that allows the lower layer material 44a that has entered the recess to engage therewith and prevents the lower layer material 44a from readily disengaging therefrom. For example, as shown in FIG. 3(a), a configuration in which a headed screw 12a is fitted into a cylindrical recess 12 can be given as an example. In this case, the head of the screw 12a acts as a coming-out preventing member whereby the lower layer material 44a that has entered the recess 12 engages with the head of the screw 12a and hardens, and thus the lower layer material 44 is prevented from readily disengaging from the recess 12. Moreover, FIG. 3(b) shows an example in which the shape of a recess 12 is altered where the recess 12 has a wedge-like shape (tapered shape) that gradually increases in internal diameter, and the lower layer material 44a that has entered the recess 12 spreads therein, and is thereby prevented from readily disengaging from the recess 12. It goes without saying that the shapes and the like described above are given by way of example only, and various modifications can be made thereto. For example, processing such as roughening or groove cutting may be performed on an inner surface of a recess 12.

As shown in FIG. 4, the electrode projecting die 14 is a projecting die having the pattern 15 of the design of the three-dimensional emblem 40 provided protruding from an upper surface thereof. In the embodiment shown in the drawings, the design of alphabetic letters "WAIV" is provided as an example.

The electrode flat plate die 11 and the electrode projecting die 14 described above are attached to the frame 16 by, for example, being screwed to sliders 18 that are slidably provided on the left and right inner sides of the frame 16, and constitute the slide jig 10. It is desirable that left and right longitudinal frame members 17 of the frame 16 have such a length that enables the two dies 11 and 14 to be slid in directions of the arrows in FIG. 1 and positioned at the same position in the middle of the frame members 17 in the length direction thereof, that is, a length that is three times the length of the dies. This makes it possible to position the dies 11 and 14 simply by sliding the dies 11 and 14 in the directions of the arrows and abutting the dies against respective lateral frame members 19. Specifically, as shown in FIG. 1, the electrode flat plate die 11 can be positioned at the middle of the slide jig 10 by abutting the electrode projecting die 14 against the lower lateral frame member 19 in this drawing. Also, the electrode projecting die 14 can be positioned at the middle of the slide jig 10 by sliding the electrode flat plate die 11 so that it abuts against the upper lateral frame member 19 in the drawing. Note that the dies 11 and 14 after being positioned may be fixed using a magnet or the like in order to prevent displacement thereof.

The die that is disposed opposing the above-described slide jig 10 is the electrode recessed die 20 shown in FIG. 5, in which a reversed pattern 21 of the pattern 15 formed in the electrode projecting die 14 (FIG. 4) is engraved. In the present embodiment, the reversed pattern 21 is a reversed pattern of the pattern of the alphabetic letters "WAIV".

The slide jig 10 and the electrode recessed die 20 are mounted on the production apparatus, connected to the high-frequency oscillator, and arranged so as to be capable of approaching and separating relative to each other.

Figure 7:
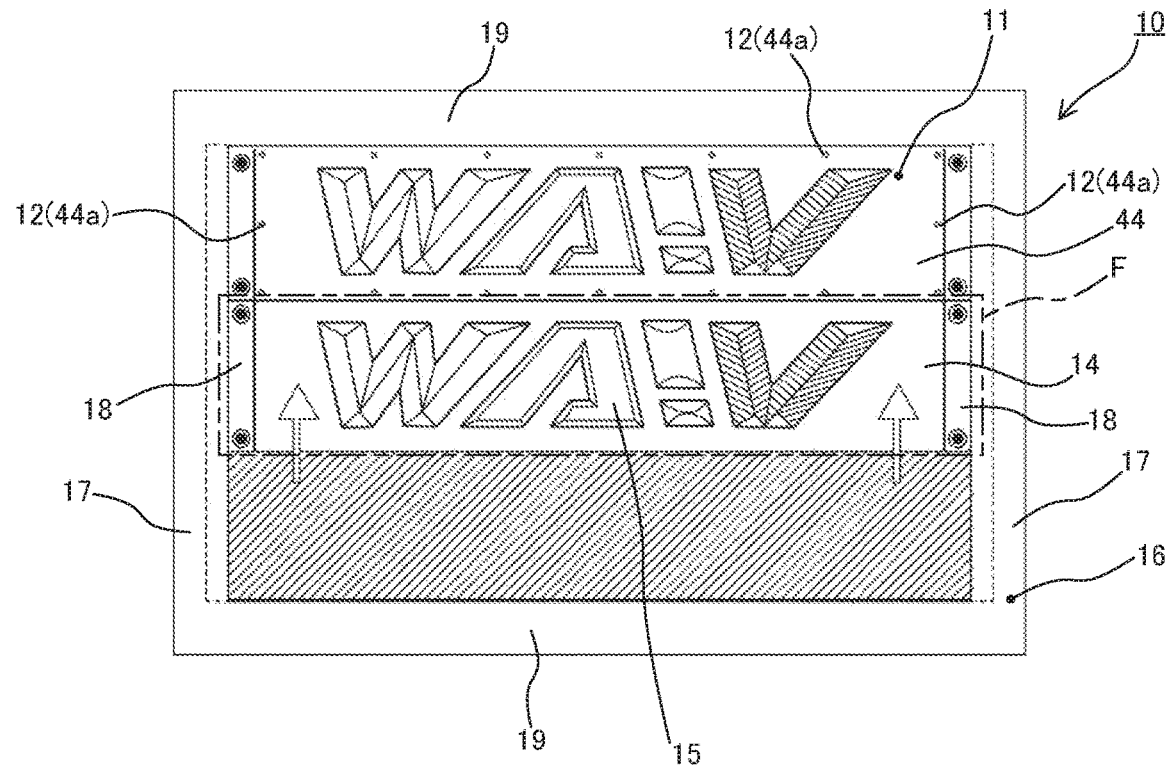
FIG. 7 is a plan view showing a state in which the dies of the slide jig have been slid after the lower layer shaping step.

With regard to the connection to the high-frequency oscillator, specifically, the slide jig 10 is connected to the high-frequency oscillator such that a high-frequency voltage is continuously generated in an area indicated by a dash-dotted line F of the die that is located at the middle of the slide jig 10 in the length direction, that is, the electrode flat plate die 11 in FIG. 1 or the electrode projecting die 14 in FIG. 7. Moreover, the high-frequency oscillator is connected to a rear surface side of the electrode recessed die 20 on which the reversed pattern 21 is not formed.

Moreover, with regard to the arrangement that allows the slide jig 10 and the electrode recessed die 20 to be capable of approaching and separating relative to each other, it is possible, for example, to mount the slide jig 10 on the table or the like with the dies 11 and 14 facing upward, attach the electrode recessed die 20 to an actuator, such as a cylinder, such that the reversed pattern 21 faces downward and the electrode recessed die 20 is disposed at the middle of the slide jig 10 in the length direction, and allow the electrode recessed die 20 to approach and separate from the slide jig 10 through an operation of the actuator.

In the thus configured apparatus for producing the three-dimensional emblem 40, the lower layer material 44 and the upper layer material 46, which are constituent materials of the three-dimensional emblem 40, are individually and sequentially disposed and shaped or molded through high-frequency dielectric heating, and furthermore, the materials 44 and 46 are welded to each other.

A soft sheet of a thermoplastic synthetic resin or a foamed resin sheet can be used as the lower layer material 44, and examples thereof include thermoplastic synthetic resins such as soft polyvinyl chloride (PVC).

In the present invention, since the lower layer material 44 is subjected to high-frequency dielectric heating separately from the upper layer material 46, a thermoplastic synthetic resin sheet or a foamed resin sheet that is thicker than a conventional sheet can be adopted. For example, the thickness of the lower layer material 44 may be set to be more than 2 mm, and the shaping of a lower layer material having such a thickness is difficult with a conventional method. A thickness of about 2.3 mm to 6 mm is favorable for the lower layer material 44, but the present invention is also applicable to a lower layer material having a greater thickness than this.

The upper layer material 46 is a laminated film containing a thermoplastic synthetic resin film that can be molded through high-frequency dielectric heating, a vapor-deposited metal layer, and the like. Examples of the thermoplastic synthetic resin film include soft thermoplastic synthetic resins such as polyvinyl chloride and polyurethane. For example, a vapor-deposited-metal laminated film obtained by performing metal vapor deposition on a thermoplastic synthetic resin film located on an upper surface side can be used as the upper layer material 46. Note that the upper layer material 46 may also have a configuration in which an adhesive layer, a migration preventing film, or an adhesive layer is disposed on a lower surface of the vapor-deposited metal layer as necessary, and a thermoplastic synthetic resin film is further disposed thereunder.

An example of the migration preventing film is an ethylene-vinyl alcohol copolymer (EVOH) film, and prevents a dye of a garment or the like to which the three-dimensional emblem 40 is attached from migrating to a front surface side of the three-dimensional emblem 40.

A desired design can also be printed in a desired color onto an upper surface of the upper layer material 46 using a transparent color ink, a matte ink, a glossy ink, or the like. Furthermore, a fine line design can also be added by screen printing an ultraviolet-curable transparent UV ink or the like onto the above-described printing, so that a sense of luxuriousness such as that of braided embroidery, an aura of substance, elaborateness, a depth of color, and a metallic appearance, and furthermore, minute projections and depressions, and the like can also be expressed.

Note that, in the present invention, the upper layer material 46 is subjected to high-frequency dielectric heating separately from the lower layer material 44, and therefore, shaping of the lower layer material 44 can be performed with a high current, while high-frequency dielectric heating of the upper layer material 46 containing the vapor-deposited metal layer, which is subject to blushing, can be performed with a current of a magnitude that does not cause blushing of the vapor-deposited metal layer. Accordingly, blushing of the vapor-deposited metal layer of the upper layer material 46 can be prevented, and therefore, the apparatus and the method for producing the three-dimensional emblem 40 of the present invention are particularly preferable for the production of the three-dimensional emblem 40 with the use of the upper layer material 46 containing the vapor-deposited metal layer.

Hereinafter, a method for producing the three-dimensional emblem 40 with the use of the above-described production apparatus, the lower layer material 44, and the upper layer material 46 will be described.

Lower Layer Shaping Step

In this step, the lower layer material 44 having the above-described configuration is shaped through high-frequency dielectric heating. Specifically, the electrode recessed die 20 is separated (moved up) from the slide jig 10, and the lower layer material 44 is placed on the electrode flat plate die 11. The lower layer material 44 is disposed such that an unnecessary portion thereof to be removed in a downstream step opposes the recesses 12.

Then, the dies 11 and 14 of the slide jig 10 are slid such that the electrode flat plate die 11 is located at the middle of the slide jig 10 in the length direction as shown in FIG. 1 (the lower layer material is not shown in this drawing). From this state, while the high-frequency oscillator operates, the electrode recessed die 20 is brought closer to (moved down toward) the electrode flat plate die 11 as shown in FIG. 6(a), and high-frequency dielectric heating is performed with the lower layer material 44 sandwiched between the dies 11 and 20. Thus, the entire lower layer material 44 is softened due to an insulator thereof generating heat and fusing, and is also shaped. Note that since the shaping of the lower layer material 44 is performed separately from the upper layer material 46, which is subject to blushing, the power of the high-frequency oscillator can be increased. Accordingly, even a thick lower layer material 44 can be shaped as well.

At this time, the lower layer material 44 that opposes the recesses 12 is softened, and portions 44a thereof enter the recesses 12 as shown in FIG. 3. For example, in the case where a screw 12a serving as a coming-out preventing member is disposed in a recess 12 as shown in FIG. 3(a), the softened lower layer material 44a engages with the head of the screw 12a. Alternatively, in the case where a recess 12 is formed in a wedge-like shape as shown in FIG. 3(b), the lower layer material 44a that has entered the recess 12 spreads inside the recess 12. In either case, a configuration that prevents the lower layer material 44 from readily disengaging from the recesses 12 is achieved, and the shaped lower layer material 44 is held on the electrode flat plate die 11.

From this state, the electrode recessed die 20 is separated (moved up), and, as shown in FIG. 6(b), the shaped lower layer material 44 thus remains held on the electrode flat plate die 11 without positional displacement occurring (FIG. 7 shows the shaped lower layer material 44).

Upper Layer Molding Step

Next, the upper layer material 46 is molded through high-frequency dielectric heating. Specifically, while the electrode recessed die 20 is kept separated (moved up) from the slide jig 10, the upper layer material 46 is placed on the electrode projecting die 14.

Then, the dies 11 and 14 of the slide jig 10 are slid such that the electrode projecting die 14 is located at the middle of the slide jig 10 in the length direction as shown in FIG. 7 (the upper layer material is not shown in this drawing). From this state, while the high-frequency oscillator operates, the electrode recessed die 20 is brought closer to (moved down toward) the electrode projecting die 14 as shown in FIG. 8(a), and high-frequency dielectric heating is performed with the upper layer material 46 sandwiched between the dies 14 and 20. Thus, the entire upper layer material 46 is softened due to an insulator thereof generating heat and fusing, and is also molded following the patterns 15 and 21 of the respective dies 14 and 20. Since the upper layer material 46 is as thin as about 0.2 mm to 0.7 mm, for example, the high-frequency dielectric heating of the upper layer material 46 can be performed with a moderate current, and therefore, blushing of the vapor-deposited metal layer in the upper layer material 46 can be prevented.

When the molding of the upper layer material 46 is completed, the electrode recessed die 20 is separated (moved up) as shown in FIG. 8(b). At this time, it is desirable to attach the upper layer material 46 to the electrode recessed die 20 with a piece of pressure-sensitive adhesive tape or the like lest the molded upper layer material 46 detach from the electrode recessed die 20.

Welding Step

Figure 9:
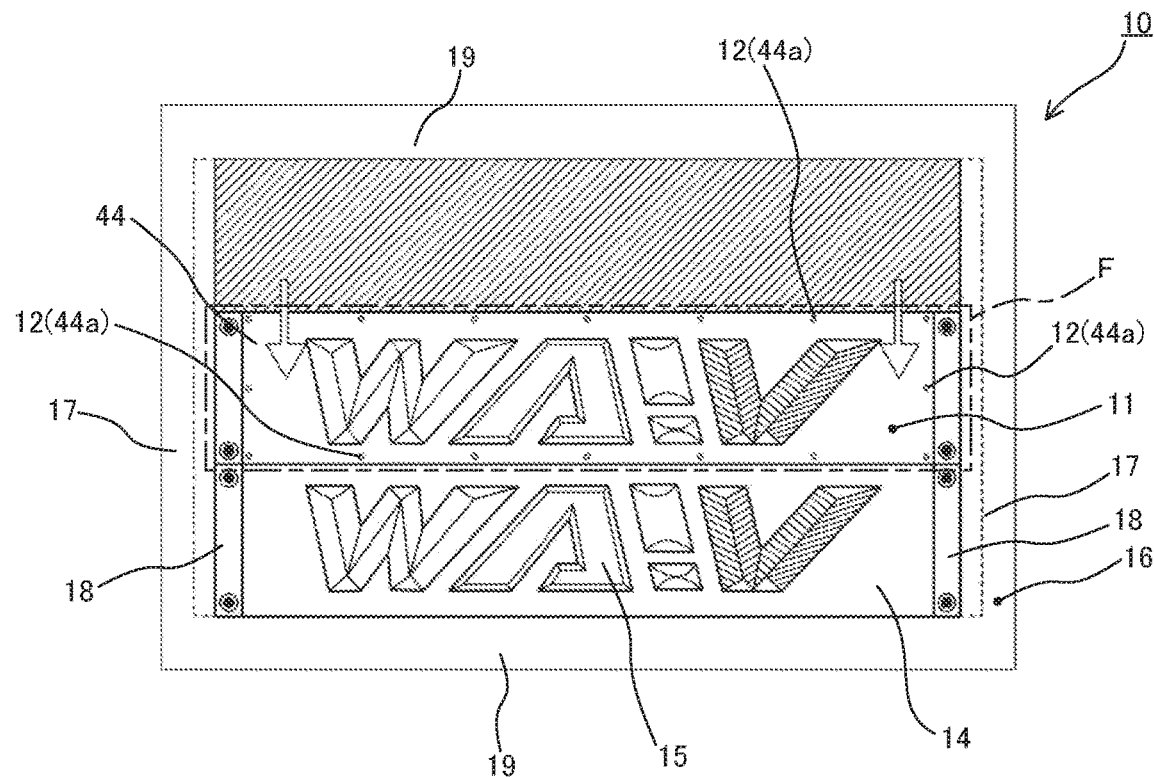
FIG. 9 is a plan view showing a state in which the dies of the slide jig have been slid after the upper layer molding step.
Figure 10:
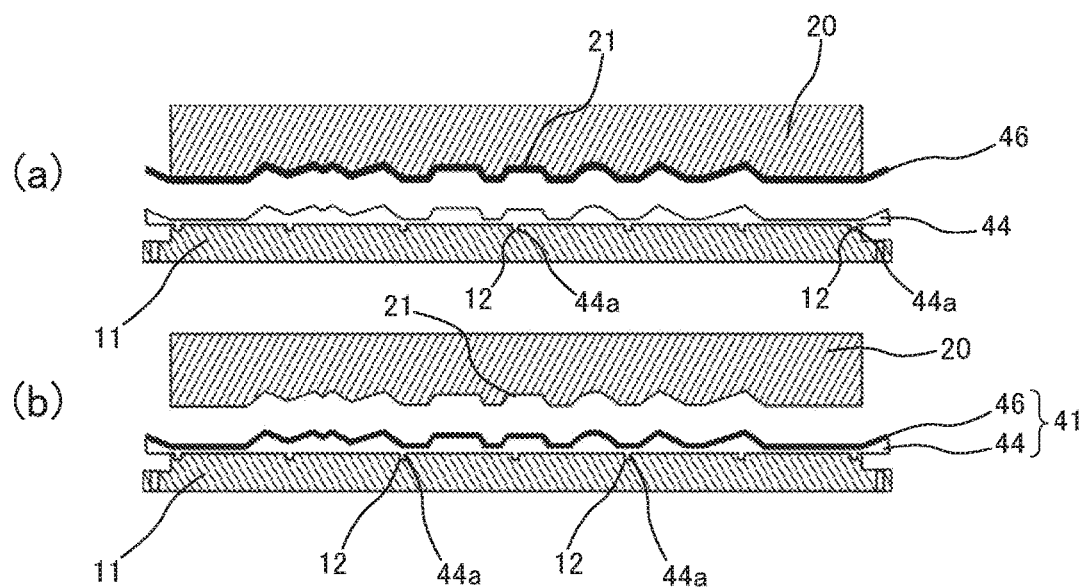
FIG. 10 is an explanatory diagram for illustrating a welding step.

Subsequently, the shaped lower layer material 44 and the molded upper layer material 46 are brought into close contact with each other and integrated. Specifically, while the electrode recessed die 20 is kept separated (moved up) from the slide jig 10, the dies 11 and 14 of the slide jig 10 are slid such that the electrode flat plate die 11 holding the lower layer material 44 is located at the middle of the slide jig 10 in the length direction as shown in FIG. 9. From this state, while the high-frequency oscillator operates, the electrode recessed die 20 holding the upper layer material 46 is brought closer to (moved down toward) the electrode flat plate die 11 holding the lower layer material 44 as shown in FIG. 10(*a*), and high-frequency dielectric heating is performed with the lower layer material 44 and the upper layer material 46 brought into close contact with each other using the dies 11 and 20. Thus, the lower layer material 44 and the upper layer material 46 are in close contact with each other and integrated due to the insulators thereof generating heat and fusing again. Moreover, as a result of this high-frequency dielectric heating, the shapes of the lower layer material 44 and the upper layer material 46 are set.

According to the present invention, the lower layer material 44 is held on the electrode flat plate die 11 without positional displacement occurring because the portions 44*a* of the lower layer material 44 enter the recesses 12, and the upper layer material 46 is held on the electrode recessed die 20 without positional displacement occurring, by the pressure-sensitive adhesive tape or the like. Accordingly, the lower layer material 44 and the upper layer material 46 can be aligned with each other without deviation simply by moving the electrode flat plate die 11 to the middle of the slide jig 10 in the length direction and bringing the electrode recessed die 20 closer to the electrode flat plate die 11, and the two materials can then be integrated through welding. In this manner, the operation for aligning the lower layer material 44 and the upper layer material 46 with each other can be simplified as much as possible, and therefore, the advantages of enhancing the production efficiency and reducing the workload can be obtained.

When the integration of the lower layer material 44 and the upper layer material 46 in close contact with each other is completed, the electrode recessed die 20 is separated (moved up). Thus, a three-dimensional emblem material 41 in which the lower layer material 44 and the upper layer material 46 are in close contact with each other and integrated as shown in FIG. 10(*b*) is left on the electrode flat plate die 11.

Die-Release Step

When the welding step is completed, the three-dimensional emblem material 41 is cooled and hardened, and then, is removed from the electrode flat plate die 11. Thus, the lower layer material 44*a* that has entered the recesses 12 as shown in FIG. 3 is pulled out of the recesses 12, and the three-dimensional emblem material 41 is released from the electrode flat plate die 11.

Finishing Step

Since the three-dimensional emblem material 41 released from the die has an unnecessary portion in addition to the design portion 42, the unnecessary portion is removed through finishing. Also, in order to attach the three-dimensional emblem 40 to various products as necessary, a piece of double-sided tape 48 or a hot-melt film and a piece of release paper 49 are placed on a rear surface of the emblem. Note that, after the unnecessary portion has been removed, the design portion 42 may be displaced when removing the release paper 49, depending on the pattern, and for this reason, an application film is attached to the front surface. Examples of the application film include, but are not limited to, sheets in which an acrylic pressure-sensitive adhesive is applied to a polyester film or paper.

Figure 11:
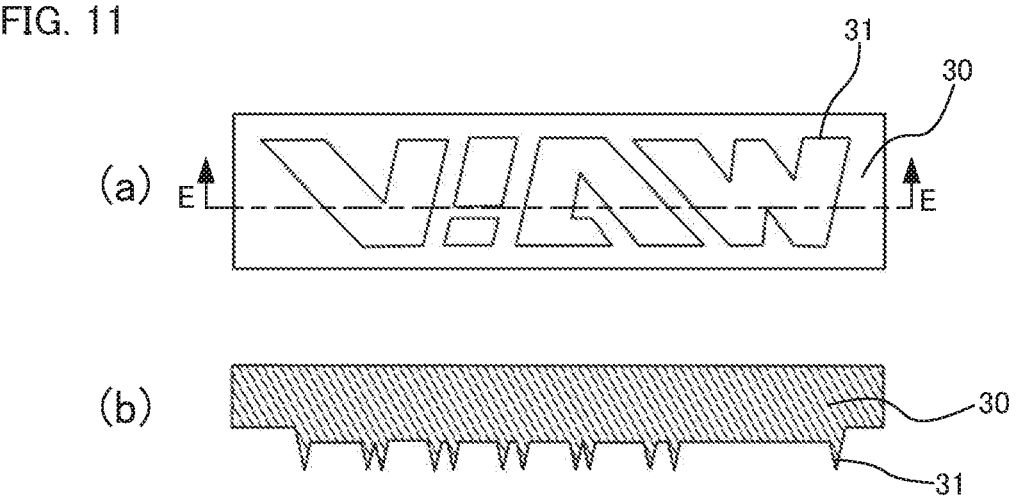
FIG. 11(a) is a plan view of a fusion cutting blade die.
FIG. 11(b) is a cross-sectional view taken along line E-E.
Figure 12:
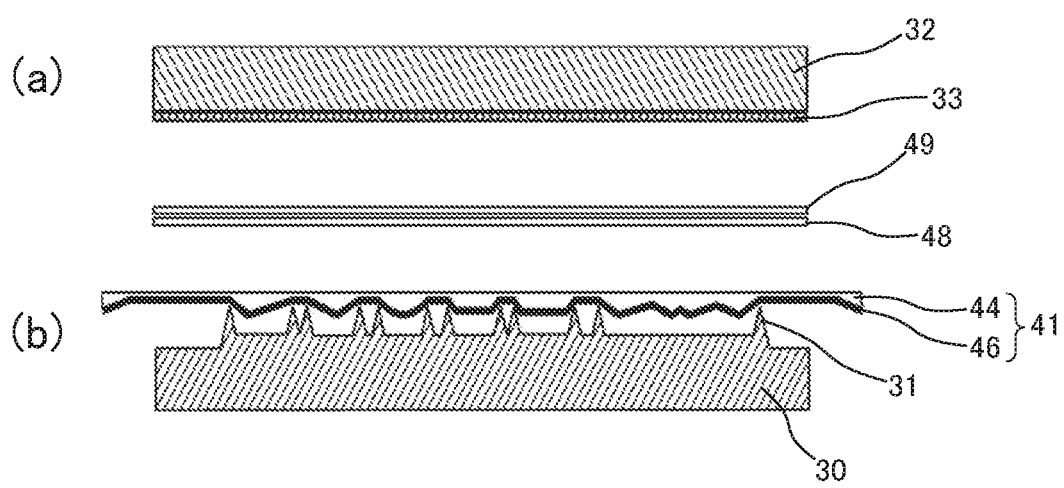
FIG. 12 is an explanatory diagram for illustrating a fusion cutting step.
Figure 13:
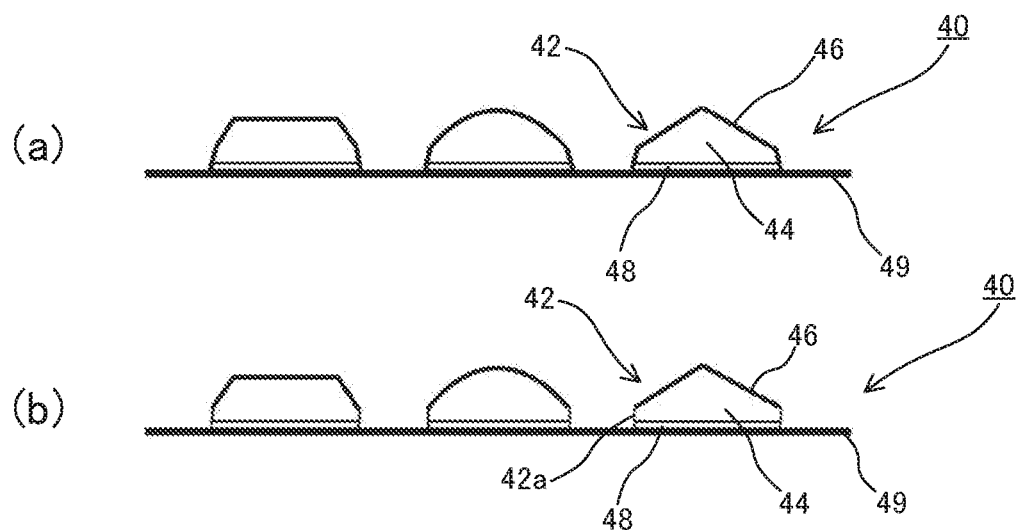
FIG. 13(a) is a cross-sectional view of a three-dimensional emblem obtained through high-frequency fusion cutting.
FIG. 13(b) is a cross-sectional view of a three-dimensional emblem obtained through Thomson kiss cutting or laser kiss cutting.
Figure 14:
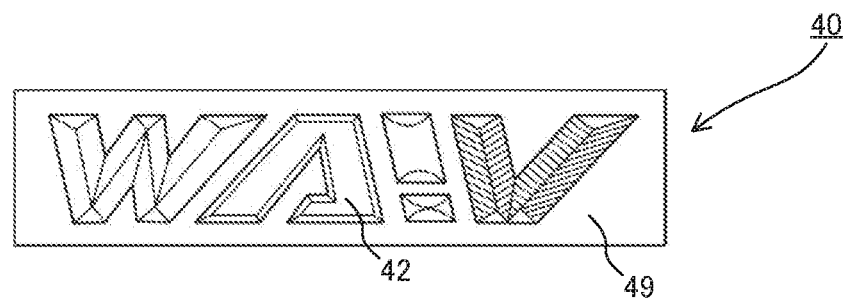
FIG. 14 is a plan view of a three-dimensional emblem.

The removal of the unnecessary portion can be performed using, for example, an engraved die 30 that only has fusion-cutting blades 31 extending along an outer peripheral shape of the three-dimensional emblem 40 as shown in FIG. 11. The engraved die 30 is placed on a table or the like with the fusion-cutting blades 31 protruding upward. The three-dimensional emblem material 41 is fitted to the fusion-cutting blades 31 with the lower layer material 44 located on the upper side as shown in FIG. 12, and the double-sided tape 48 or the hot-melt film and the release paper 49 are placed on the lower layer material 44. Then, an upper flat plate electrode 32 with a surface thereof covered with an insulating cloth 33 is brought closer to the three-dimensional emblem material 41, and dielectric heating is performed by generating a high-frequency voltage while pressing. Thus, as shown in FIGS. 13(*a*) and 14, high-frequency fusion cutting of the three-dimensional emblem material 41 along the outer peripheral shape thereof can be performed using the fusion-cutting blades 31. The high-frequency fusion cutting causes the upper layer material 46 to be extended to reach the release paper 49 at the bottom surface, and the entire design portion 42 to be covered with the upper layer material 46, and thus, an excellent appearance can be achieved. Note that, during the high-frequency fusion cutting, although the three-dimensional emblem material 41 is fusion-cut, the release paper 49 remains without being fusion-cut.

Note that the removal of the unnecessary portion may also be performed through Thomson kiss cutting, laser kiss cutting, or the like instead of high-frequency fusion cutting. FIG. 13(*b*) is a cross-sectional view of a three-dimensional emblem 40 obtained through Thomson kiss cutting or laser kiss cutting. With these kiss cutting methods, side surfaces 42*a* of the design portion 42 of the upper layer material 46 will be cut. Therefore, high-frequency fusion cutting, which causes the upper layer material 46 to be extended to reach the bottom surface as described above, provides more appealing cut surfaces.

After that, an application film can be attached to the obtained three-dimensional emblem 40 as necessary.

According to the present invention, since the lower layer material 44 is shaped separately from the upper layer material 46, a high current can be applied during high-frequency dielectric heating, and therefore, a thick lower layer material 44 can be adopted. This makes it possible to obtain a bulky three-dimensional emblem 40 having a three-dimensional appearance and a sense of luxuriousness. For example, when a lower layer material 44 that is 2.3 mm to 6 mm thick is used, a three-dimensional emblem 40 having a thickness of 2.5 mm to 6.2 mm can be produced.

Moreover, since the lower layer material 44 and the upper layer material 46 are respectively held on the dies 11 and 20, the two materials can be aligned with each other simply by sliding the dies 11 and 14, and this makes it possible to enhance the production efficiency and reduce the workload.

The foregoing description is given merely to describe the present invention. Accordingly, it should not be construed as limiting the invention recited in the appended claims or narrowing the scope of the present invention. Also, the constituent elements of the present invention are not limited to those described in the embodiments above, and it is of course possible to make various modifications within the technical scope defined in the appended claims.

For example, the slide jig 10 is not limited to that of the embodiments shown in the drawings, and a dual table sliding high-frequency welder or a rotary high-frequency welder may also be adopted.

Furthermore, although the lower layer material 44 is held on the electrode flat plate die 11 by the portions 44*a* thereof entering the recesses 12, the holding method is not limited to this, and, for example, the lower layer material 44 may be attached to the electrode flat plate die 11 with a piece of pressure-sensitive adhesive tape.

In addition, the layer configurations, the materials, the thickness, and the like of the lower layer material 44 and the upper layer material 46 are given by way of example only, and it should be understood that changes, such as the insertion of an additional intermediate layer and the like, can be made thereto.

LIST OF REFERENCE NUMERALS

10 Slide jig
11 Electrode flat plate die
12 Recess
12*a* Screw
14 Electrode projecting die
20 Electrode recessed die
40 Three-dimensional emblem
44 Lower layer material
44*a* Lower layer material that has entered recess
46 Upper layer material

The invention claimed is:

1. An apparatus for producing a three-dimensional emblem made of a thermoplastic synthetic resin, the three-dimensional emblem being obtained by welding and integrating an upper layer material containing a vapor-deposited-metal laminated film and a lower layer material containing a thermoplastic synthetic resin sheet through high-frequency dielectric heating, the apparatus comprising:
   a slide jig in which an electrode flat plate die and an electrode projecting die are provided in such a manner as to be slidable in a horizontal plane;
   an electrode recessed die that is capable of approaching and separating from the slide jig in a vertical direction and is disposed at a position where the electrode recessed die can oppose the electrode flat plate die and the electrode projecting die; and
   a high-frequency oscillator that, in a state in which the electrode recessed die and the electrode flat plate die or the electrode projecting die of the slide jig are opposed to each other, performs high-frequency dielectric heating by continuously generating a high-frequency voltage across the opposing dies, wherein:
   one or more recesses are formed in a surface of the electrode flat plate die that opposes the electrode recessed die, at a position not overlapping a design portion of the three-dimensional emblem, and
   when high-frequency dielectric heating is performed with the lower layer material sandwiched between the electrode flat plate die and the electrode recessed die, a portion of the lower layer material enters the recess, so that the lower layer material that has been shaped is held on the electrode flat plate die.

2. The apparatus for producing a three-dimensional emblem made of a thermoplastic synthetic resin according to claim 1,
   wherein a coming-out preventing member for preventing the lower layer material that has entered the recess of the electrode flat plate die from coming out is formed in the recess.

3. The apparatus for producing a three-dimensional emblem made of a thermoplastic synthetic resin according to claim 1,
   wherein the recess of the electrode flat plate die has a wedge shape that gradually increases in internal diameter.

4. A method for producing a three-dimensional emblem made of a thermoplastic synthetic resin, the three-dimensional emblem being obtained by welding and integrating an upper layer material containing a vapor-deposited-metal laminated film and a lower layer material containing a thermoplastic synthetic resin sheet through high-frequency dielectric heating with the use of an apparatus for producing a three-dimensional emblem made of a thermoplastic synthetic resin, the apparatus including:
   a slide jig in which an electrode flat plate die and an electrode projecting die are provided in such a manner as to be slidable in a horizontal plane;
   an electrode recessed die that is capable of approaching and separating from the slide jig in a vertical direction and is disposed at a position where the electrode recessed die can oppose the electrode flat plate die and the electrode projecting die; and
   a high-frequency oscillator that, in a state in which the electrode recessed die and the electrode flat plate die or the electrode projecting die of the slide jig are opposed to each other, performs high-frequency dielectric heating by continuously generating a high-frequency voltage across the opposing dies,
   the method comprising:
   a lower layer shaping step of disposing the lower layer material between the electrode flat plate die and the electrode recessed die, bringing the electrode flat plate die and the electrode recessed die closer to each other, and performing high-frequency dielectric heating, wherein the lower layer material that has been shaped is held on the electrode flat plate die, and the electrode flat plate die and the electrode recessed die are separated from each other, wherein:
      one or more recesses are formed in a surface of the electrode flat plate die that opposes the electrode recessed die, at a position not overlapping a design portion of the three-dimensional emblem, and
      in the lower layer shaping step, a portion of the lower layer material enters the recess, so that the lower layer material is held on the electrode flat plate die;
   an upper layer molding step of molding the upper layer material by sliding the electrode projecting die of the slide jig such that the electrode projecting die opposes the electrode recessed die, disposing the upper layer material between the electrode projecting die and the electrode recessed die, bringing the electrode projecting die and the electrode recessed die closer to each other, and performing high-frequency dielectric heating, wherein the upper layer material that has been molded is held on the electrode recessed die, and the electrode projecting die and the electrode recessed die are separated from each other; and
   a welding step of sliding the electrode flat plate die holding the lower layer material, of the slide jig such that the electrode flat plate die opposes the electrode recessed die holding the upper layer material, bringing the electrode flat plate die and the electrode recessed die closer to each other, and performing high-frequency dielectric heating while pressing the lower layer material and the upper layer material that are laid one on top of the other, thereby welding the lower layer material and the upper layer material to each other, and then separating the electrode flat plate die and the electrode recessed die from each other.

5. The apparatus for producing a three-dimensional emblem made of a thermoplastic synthetic resin according to claim 1, wherein the one or more recesses are formed at a position that opposes an unnecessary portion of the lower layer material that is to be removed in a finishing step.

6. The apparatus for producing a three-dimensional emblem made of a thermoplastic synthetic resin according to claim 1,
wherein the one or more recesses are formed near peripheral edges of the electrode flat plate die.

\* \* \* \* \*